(12) United States Patent
Wang et al.

(10) Patent No.: US 12,039,361 B1
(45) Date of Patent: Jul. 16, 2024

(54) METHODS AND APPARATUSES FOR EXECUTING TASKS, STORAGE MEDIUMS, AND ELECTRONIC DEVICES

(71) Applicant: ZHEJIANG LAB, Hangzhou (CN)

(72) Inventors: Hongsheng Wang, Hangzhou (CN); Guang Chen, Hangzhou (CN); Fei Wu, Hangzhou (CN); Feng Lin, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/494,002

(22) Filed: Oct. 25, 2023

(30) Foreign Application Priority Data

Jun. 19, 2023 (CN) .......................... 202310724767.8

(51) Int. Cl.
*G06F 9/48* (2006.01)
(52) U.S. Cl.
CPC ...................................... *G06F 9/48* (2013.01)
(58) Field of Classification Search
CPC .............................. G06F 9/48; G06F 8/45–458
See application file for complete search history.

(56) References Cited

U.S. PATENT DOCUMENTS

| 2019/0286972 | A1* | 9/2019 | El Husseini | ........... G06N 3/063 |
| 2019/0286973 | A1* | 9/2019 | Kovvuri | ................... G06N 3/04 |
| 2020/0042875 | A1* | 2/2020 | Shazeer | ................ G06F 18/214 |
| 2020/0151579 | A1* | 5/2020 | Yang | ......................... G06N 3/10 |
| 2020/0202246 | A1* | 6/2020 | Lin | ................... G06F 16/24568 |
| 2021/0073625 | A1* | 3/2021 | Cai | .......................... G06N 3/04 |

(Continued)

FOREIGN PATENT DOCUMENTS

| CN | 111309479 A | 6/2020 |
| CN | 112527262 A | 3/2021 |

(Continued)

OTHER PUBLICATIONS

Whale: Scaling Deep Learning Model Training to the Trillions Xianyan Jia, Le Jiang, Ang Wang, Jie Zhang, Xinyuan Li, Wencong Xiao, Langshi chen, Yong Li, Xiaoyong Liu, Wei Lin (Year: 2021).*

(Continued)

*Primary Examiner* — Emerson C Puente
*Assistant Examiner* — Paul V Mills
(74) *Attorney, Agent, or Firm* — The Small Patent Law Group LLC; Christopher R. Carroll

(57) ABSTRACT

The present disclosure discloses a method for executing a task. The method includes: a master computing device node in a computing cluster system receives a task code of a to-be-executed task; the master computing device node divides the to-be-executed task into subtasks, and for each of the subtasks, the master computing device node determines operators required to execute the subtask based on the task code; the master computing device node respectively distributes the subtasks to computing nodes in the computing cluster system, such that for each of the computing nodes, the computing node generates an executable task subgraph for the computing node based on the operators required to execute the subtask distributed to the computing node and data transmission relationships between the operators required to execute the subtask distributed to the computing node, and runs the executable task subgraph to execute the to-be-executed task.

6 Claims, 4 Drawing Sheets

(56) References Cited

U.S. PATENT DOCUMENTS

| | | | |
|---|---|---|---|
| 2021/0304066 A1* | 9/2021 | Tomioka | G06F 9/5066 |
| 2021/0319298 A1 | 10/2021 | Pemmaraju et al. | |
| 2022/0121903 A1* | 4/2022 | Zhang | G06N 3/04 |
| 2022/0343165 A1* | 10/2022 | Hu | G06N 3/045 |
| 2023/0023101 A1* | 1/2023 | Su | G06F 17/16 |
| 2023/0052942 A1* | 2/2023 | Chauhan | G06F 9/5027 |

FOREIGN PATENT DOCUMENTS

| | | |
|---|---|---|
| CN | 112650590 A | 4/2021 |
| CN | 114970814 A | 8/2022 |
| CN | 115509743 A | 12/2022 |
| CN | 115543639 A | 12/2022 |
| CN | 116185629 A | 5/2023 |
| EP | 3992856 A1 | 5/2022 |

OTHER PUBLICATIONS

AutoTM: Automatic Tensor Movement in Heterogeneous Memory Systems using Integer Linear Programming Mark Hildebrand, Jason Lowe-Power, Venkatesh Akella, Jawad Khan, Sanjeev Trika (Year: 2020).*

Unity: Accelerating DNN Training Through Joint Optimization of Algebraic Transformations and Parallelization Colin Unger, Zhihao Jia, Wei Wu, Sina Lin, Mandeep Baines, et al. (Year: 2022).*

Alpa: Automating Inter- and Intra-Operator Parallelism for Distributed Deep Learning Lianmin Zheng; Zhuohan Li; Hao Zhang; Yonghao Zhuang; Zhifeng Chen; Yanping Huang Yida Wang Yuanzhong Xu et a. (Year: 2022).*

Parallel Training via Computation Graph Transformation Fei Wang, Guoyang Chen, Weifeng Zhang, Tiark Rompf (Year: 2019).*

Distpar:Tensor Partitioning for Distributed Neural Network Computing Hongsheng Wang, Jinhui Yuan, Shun Liu, Weijie Xia, Xinyi Zhou, Shengyu Zhang, Fei Wu, Mohamed Jaward Bah, Feng Lin Submission for ICLR 2024 Conference (Withdrawn); Submission#: 6664; openreview.net/forum?id=1GdAJ3GsOw (Year: 2023).*

Bring Your Own Codegen to Deep Learning Compiler Zhi Chen, Cody Hao Yu, Trevor Morris, Jorn Tuyls, Yi-Hsiang Lai, Jared Roesch, Elliott Delaye, Vin Sharma, Yida Wang doi.org/10.48550/arXiv.2105.03215 (Year: 2021).*

Polyhedral Optimization of TensorFlow Computation Graphs Benoit Pradelle, Benoit Meister, Muthu Baskaran, Jonathan Springer, and Richard Lethin (Year: 2019).*

Automatic Code Generation for Rocket Chip RoCC Accelerators Pengcheng Xu, Yun Liang Fourth Workshop on Computer Architecture Research with RISC-V (CARRV 2020) (Year: 2020).*

TVM: An Automated End-to-End Optimizing Compiler for Deep Learning Tianqi Chen, Thierry Moreau, Ziheng Jiang, Lianmin Zheng, Eddie Yan, Meghan Cowan, Haichen Shen, Leyuan Wang, Yuwei Hu, Luis Ceze, Carlos Guestrin, Arvind Krishnamurthy (Year: 2018).*

State Intellectual Property Office of the People's Republic of China, Office Action and Search Report Issued in Application No. 2023107247678, Jul. 28, 2023, 12 pages.(Submitted with Machine/Partial Translation).

Hao Shuixia etc. "A Method of Heterogeneous and Reconfigurable Task Partitioning Based on DAG" "Journal of Tongji University(Naturalscience) vol. 39 No. 11 Nov. 2011" Nov. 15, 2011, 6 pages.

\* cited by examiner

METHODS AND APPARATUSES FOR EXECUTING TASKS, STORAGE MEDIUMS, AND ELECTRONIC DEVICES

CROSS REFERENCE TO RELATED APPLICATIONS

This application claims priority to Chinese Patent Application No. 2023107247678 filed on Jun. 19, 2023, the entire content of which is incorporated herein by reference.

TECHNICAL FIELD

The present disclosure relates to the technical field of deep learning, and in particular to methods and apparatuses for executing tasks, storage mediums, and electronic devices.

BACKGROUND

With the development of deep learning technology, a distributed training of a deep learning model through a computing device cluster has been widely applied.

Usually, in a process of using distributed training to train a deep learning model, it is necessary to compile the task code input by users through the master computing device of multiple computing devices, to obtain executable subgraphs (that is, graph data composed of operators in the deep learning model as nodes and data transmission relationships between operators as edges, that can be run by computing devices) required for task execution based on the task code input by the user, and to distribute executable subgraphs to other computing devices for operation, resulting in a high load on the master computing device, and relatively low efficiency of task execution based on the task code input by users.

Therefore, how to reduce the load on the master computing device to improve task execution efficiency is an urgent problem to be solved.

SUMMARY

The present disclosure provides a method and an apparatus for executing a task, a storage medium, and an electronic device.

The present disclosure provides a method for executing a task, where the method is applied to a computing cluster system, and the method includes:
  receiving, by a master computing device node in the computing cluster system, a task code of a to-be-executed task;
  dividing, by the master computing device node, the to-be-executed task into subtasks, and for each of the subtasks, determining, by the master computing device node and based on the task code, operators required to execute the subtask;
  respectively distributing, by the master computing device node, the subtasks to computing nodes in the computing cluster system, such that for each of the computing nodes, the computing node generates an executable task subgraph for the computing node based on the operators required to execute the subtask distributed to the computing node and data transmission relationships between the operators required to execute the subtask distributed to the computing node, where the computing nodes are communicatedly connected with the master computing device node; and
  running, by the computing nodes, the executable task subgraphs to execute the to-be-executed task.

In some embodiments, dividing, by the master computing device node, the to-be-executed task into the subtasks, and for each of the subtasks, determining, by the master computing device node and based on the task code, the operators required to execute the subtask includes:
  determining, by the master computing device node, a global calculating graph of the to-be-executed task based on the task code, where the global calculating graph includes operators required to execute the to-be-executed task and data transmission relationships between the operators required to execute the to-be-executed task; and
  dividing, by the master computing device node, the global calculating graph into subtask calculating graphs to divide the to-be-executed task into the subtasks, where each of the subtask calculating graphs includes at least some of the operators in the global calculating graph; and
respectively distributing, by the master computing device node, the subtasks to the computing nodes in the computing cluster system, such that for each of the computing nodes, the computing node generates the executable task subgraph for the computing node based on the operators required to execute the subtask distributed to the computing node and the data transmission relationships between the operators required to execute the subtask distributed to the computing node includes:
  respectively distributing, by the master computing device node, the subtask calculating graphs to the computing nodes, such that for each of the computing nodes, the computing node generates the executable task subgraph for the computing node based on the operators of the subtask calculating graph distributed to the computing node and data transmission relationships between the operators of the subtask calculating graph distributed to the computing node.

In some embodiments, the method further includes: for each of the computing nodes,
  determining, by the computing node, an executing order of the operators in the subtask calculating graph distributed to the computing node based on the operators in the subtask calculating graph distributed to the computing node and the data transmission relationships between the operators in the subtask calculating graph distributed to the computing node;
  determining, by the computing node, memory-unit-block information required to execute the subtask corresponding to the subtask calculating graph distributed to the computing node, where the memory-unit-block information includes identification information of the memory unit block, identification information of the subtask using the memory unit block, and information of data transmission stored in the memory unit block; and
  generating, by the computing node, an executable task subgraph for the computing node based on the executing order and the memory-unit-block information.

In some embodiments, determining, by the master computing device node and based on the task code, the operators required to execute the subtask includes:
  determining, by the master computing device node and based on the task code, the operators required to execute the subtask, and determining, by the master computing device node and based on the task code, data transmission relationships between the subtask and other subtasks;

respectively distributing, by the master computing device node, the subtasks to the computing nodes in the computing cluster system, such that for each of the computing nodes, the computing node generates the executable task subgraph for the computing node based on the operators required to execute the subtask distributed to the computing node and the data transmission relationships between the operators required to execute the subtask distributed to the computing node includes:

respectively distributing, by the master computing device node, the subtasks to the computing nodes in the computing cluster system, such that for each of the computing nodes, the computing node generates the executable task subgraph for the computing node based on the operators required to execute the subtask distributed to the computing node, the data transmission relationships between the operators required to execute the subtask distributed to the computing node, and the data transmission relationships between the subtask distributed to the computing node and other subtasks.

In some embodiments, determining, by the master computing device node and based on the task code, the operators required to execute the subtask includes:

determining, based on the task code, the operators required to execute the subtask, and determining, based on the task code, data transmission relationships between the subtask and other subtasks;

respectively distributing, by the master computing device node, the subtasks to the computing nodes in the computing cluster system, such that for each of the computing nodes, the computing node generates the executable task subgraph for the computing node based on the operators required to execute the subtask distributed to the computing node and the data transmission relationships between the operators required to execute the subtask distributed to the computing node includes:

respectively distributing, by the master computing device node, the subtasks to the computing nodes, such that for each of the computing nodes, the computing node determines a target subtask based on the data transmission relationships between each of the subtasks and other subtasks, where the target subtask has a data transmission relationship with the subtask distributed to the computing node; and determining, by the computing node, whether a data transmission attribute of the computing node when executing the subtask distributed to the computing node is the same as a data transmission attribute of a computing node executing the target subtask;

in response to determining that the data transmission attribute of the computing node when executing the subtask distributed to the computing node is the same as the data transmission attribute of a computing node executing the target subtask, generating, by the computing node, the executable task subgraph for the computing node based on the operators required to execute the subtask distributed to the computing node, the data transmission relationships between the operators required to execute the subtask distributed to the computing node, and the data transmission relationships between the subtask distributed to the computing node and other subtasks.

In some embodiments, the method further includes:

in response to determining that the data transmission attribute of the computing node when executing the subtask distributed to the computing node is different from the data transmission attribute of a computing node executing the target subtask, transmitting, by the computing node, abnormal information indicating abnormal data transmission between the computing node and the computing node executing the target subtask to the master computing device node, such that the master computing device node generates a transformation subgraph based on the abnormal information returned by one or more computing nodes, where the transformation subgraph is configured to transform a data transmission attribute of a computing node to make the data transmission attribute of the computing node same as a data transmission attribute of another computing node; and generating, by the computing node, the executable task subgraph for the computing node based on the operators required to execute the subtask distributed to the computing node, the data transmission relationships between the operators required to execute the subtask distributed to the computing node, and the transformation subgraph.

In some embodiments, generating, by the master computing device node, the transformation subgraph based on the abnormal information returned by the one or more computing nodes includes:

generating, by the master computing device node, the transformation subgraph based on the abnormal information returned by the one or more computing nodes and transmitting, by the master computing device node, the transformation subgraph to the one or more computing nodes;

for each of the one or more computing nodes, based on information of data transmission between the computing node and other computing nodes through the transformation subgraph when the computing node executes the subtask distributed to the computing node in the transformation subgraph, determining, by the master computing device node, memory-unit-block information required for data transmission between the computing node and other computing nodes through the transformation subgraph when the computing device executes the subtask distributed to the computing node, as target memory-unit-block information;

determining, by the master computing device node, an identification number of the target memory-unit-block information, and storing, by the master computing device node, the identification number of the target memory-unit-block information and an identification number of the computing node as an identification number pair in the transformation subgraph;

generating, by the computing node, the executable task subgraph for the computing node based on the operators required to execute the subtask distributed to the computing node, the data transmission relationships between the operators required to execute the subtask distributed to the computing node, and the transformation subgraph includes:

determining, by the computing node, whether there is the identification number pair corresponding to the identification number of the computing node in the transformation subgraph;

in response to determining that there is the identification number pair corresponding to the identification number of the computing node in the transformation subgraph, obtaining, by the computing node, the target memory-unit-block information based on the identification number of the target memory-unit-block information in the identification number pair corresponding to the identification number of the computing node, and generating, by the computing node, the executable task subgraph for the computing node based on the operators required to execute the subtask distributed to the computing node, the data transmission relationships between the operators required to execute the subtask distributed to the computing node, the transformation subgraph, and the target memory-unit-block information.

In some embodiments, the method further includes:

in response to determining that there is no the identification number pair corresponding to the identification number of the computing node in the transformation subgraph, based on information of data transmission between the computing node and other computing nodes through the transformation subgraph when the computing node executes the subtask distributed to the computing node in the transformation subgraph, determining, by the master computing device node, memory-unit-block information required for data transmission between the computing node and other computing nodes through the transformation subgraph when the computing device executes the subtask distributed to the computing node.

The present disclosure provides an apparatus for executing a task, including:

a receiving module, configured to, by a master computing device node, receive a task code of a to-be-executed task;

a determining module, configured to, by the master computing device node, divide the to-be-executed task into subtasks, and for each of the subtasks, determine operators required to execute the subtask based on the task code;

a generating module, configured to, by the master computing device node, respectively distribute the subtasks to computing nodes, such that for each of the computing nodes, the computing node generates an executable task subgraph for the computing node based on the operators required to execute the subtask distributed to the computing node and data transmission relationships between the operators required to execute the subtask distributed to the computing node; and an executing module, configured to, by the computing nodes, run the executable task subgraphs to execute the to-be-executed task.

In some embodiments, the determining module is configured to, by the master computing device node, determine a global calculating graph of the to-be-executed task based on the task code, where the global calculating graph includes operators required to execute the to-be-executed task and data transmission relationships between the operators required to execute the to-be-executed task; and divide the global calculating graph into subtask calculating graphs to divide the to-be-executed task into subtasks, where each of the subtask calculating graphs includes at least some of the operators in the global calculating graph; and the generating module is configured to, by the master computing device node, respectively distribute the subtask calculating graphs to the computing nodes, such that for each of the computing nodes, the computing node generates the executable task subgraph for the computing node based on the operators of the subtask calculating graph distributed to the computing node and data transmission relationships between the operators of the subtask calculating graph distributed to the computing node.

In some embodiments, the generating module is configured to, by the computing node, determine an executing order of the operators in the subtask calculating graph distributed to the computing node based on the operators in the subtask calculating graph distributed to the computing node and the data transmission relationships between the operators in the subtask calculating graph distributed to the computing node; determine memory-unit-block information required to execute the subtask corresponding to the subtask calculating graph distributed to the computing node, where the memory-unit-block information includes identification information of the memory unit block, identification information of the subtask using the memory unit block, and information of data transmission stored in the memory unit block; and generate an executable task subgraph for the computing node based on the executing order and the memory-unit-block information.

In some embodiments, the generating module is configured to, by the master computing device node, determine the operators required to execute the subtask based on the task code, and determine data transmission relationships between the subtask and other subtasks based on the task code; and respectively distribute the subtasks to the computing nodes in the computing cluster system, such that for each of the computing nodes, the computing node generates the executable task subgraph for the computing node based on the operators required to execute the subtask distributed to the computing node, the data transmission relationships between the operators required to execute the subtask distributed to the computing node, and the data transmission relationships between the subtask distributed to the computing node and other subtasks.

In some embodiments, the determining module is configured to, by the master computing device node, determine the operators required to execute the subtask based on the task code, and determine data transmission relationships between the subtask and other subtasks based on the task code; and the generating module is configured to, by the master computing device node, respectively distribute the subtasks to the computing nodes, such that for each of the computing nodes, the computing node determines a target subtask based on the data transmission relationships between each of the subtasks and other subtasks, where the target subtask has a data transmission relationship with the subtask distributed to the computing node; and determine whether a data transmission attribute of the computing node when executing the subtask distributed to the computing node is the same as a data transmission attribute of a computing node executing the target subtask; in response to determining that the data transmission attribute of the computing node when executing the subtask distributed to the computing node is the same as the data transmission attribute of a computing node executing the target subtask, generate the executable task subgraph for the computing node based on the operators required to execute the subtask distributed to the computing node, the data transmission relationships between the operators required to execute the subtask distributed to the computing node, and the data transmission relationships between the subtask distributed to the computing node and other subtasks.

The present disclosure provides a non-transitory computer-readable storage medium, where the storage medium stores a computer program, and the computer program when executed by a processor achieves the above method for executing a task.

The present disclosure provides an electronic device including a memory, a processor and a computer program stored on the memory and runnable on the processor, where the processor, when the program is executed by the processor, achieves the above method for executing a task.

At least one of the above technical solutions in the present disclosure can achieve the following beneficial effects.

In the method of for executing a task provided in the present disclosure, the master computing device node in the computing cluster system receives a task code of a to-be-executed task; the master computing device node divides the to-be-executed task into subtasks, and for each of the subtasks, the master computing device node determines operators required to execute the subtask based on the task code; the master computing device node respectively distributes the subtasks to computing nodes in the computing cluster system, such that for each of the computing nodes, the computing node generates an executable task subgraph for the computing node based on the operators required to execute the subtask distributed to the computing node and data transmission relationships between the operators required to execute the subtask distributed to the computing node, where the computing nodes are communicatedly connected with the master computing device node; and the computing nodes run the executable task subgraphs to execute the to-be-executed task.

From the above methods, it can be seen that the compilation work of the task code input by the user for the to-be-executed task can be divided by the master computing device node, and some of the compilation work can be distributed to the computing nodes for execution, thereby reducing the workload of the master computing device node and improving the execution efficiency of the to-be-executed task.

BRIEF DESCRIPTION OF DRAWINGS

The accompanying drawings illustrated herein are used to provide further understanding of the present disclosure and form a part of the present disclosure. The exemplary embodiments and descriptions of the present disclosure are used to explain the present disclosure, and do not constitute an improper limitation of the present disclosure.

DETAILED DESCRIPTION

In order to make the purposes, technical solutions and advantages of the present disclosure clearer, the technical solutions of the present disclosure will be clearly and completely described below in conjunction with specific embodiments and corresponding drawings of the present disclosure. The described embodiments are only a part of the embodiments of the present disclosure, and not all of them. Other embodiments achieved by those of ordinary skill in the art based on the embodiments in the present disclosure without paying creative work shall all fall within the scope of protection of the present disclosure.

The technical solutions provided by the embodiments of the present disclosure are described in detail below in conjunction with the accompanying drawings.

Figure 1:
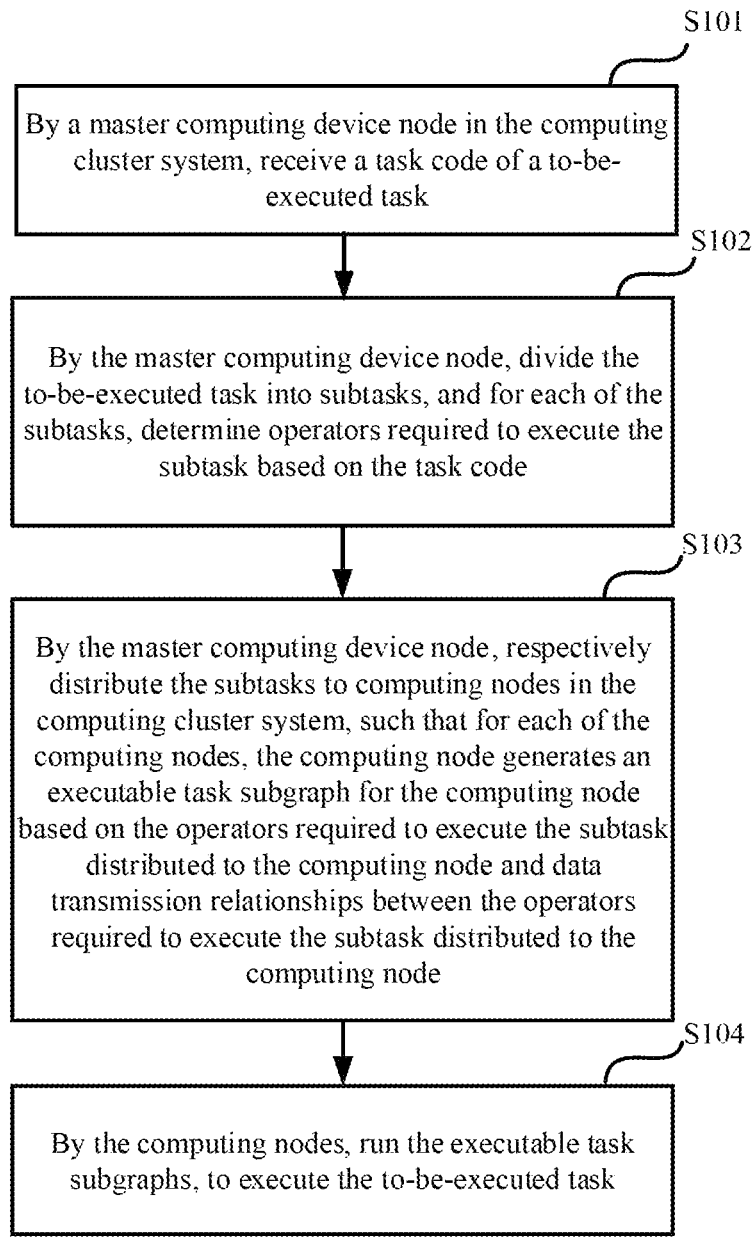
FIG. 1 is a schematic flowchart of a method for executing a task provided in the present disclosure.

FIG. 1 is a schematic flowchart of a method for executing a task provided in the present disclosure. The method includes the following steps S101-S104.

In S101, by a master computing device node in the computing cluster system, a task code of a to-be-executed task is received.

In the present disclosure, the device corresponding to the master computing device node in the computing cluster system, after receiving the task code of the to-be-executed task by the user, can analyse the received task code, to determine the global calculating graph of the to-be-executed task.

The global calculating graph is a graphical representation of the calculation process of executing the task according to the task code input by the user through a deep learning model. The global calculating graph includes the operators required to execute the task and the data transmission relationships between operators. In the global calculating graph, each node is used to represent the operator included in the constructed deep learning model for executing the task, each edge is used to represent the data transmission relationships between operators, as shown in FIG. 2.

Figure 2:
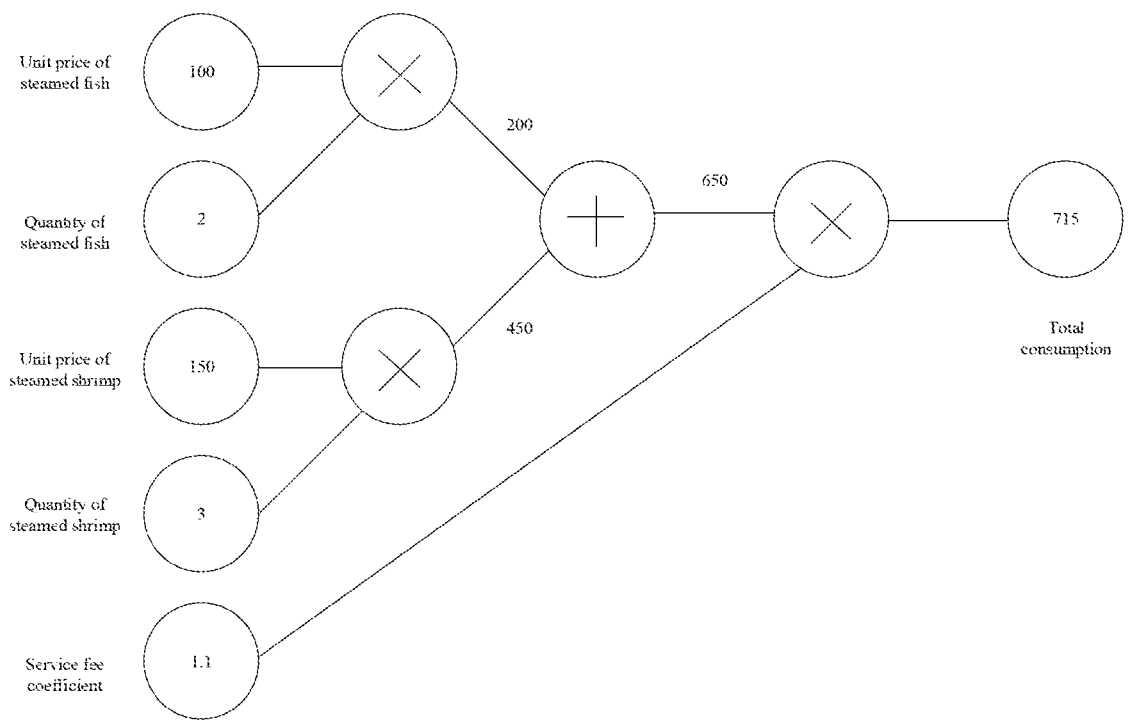
FIG. 2 is a schematic diagram of a calculating graph provided in the present disclosure.

FIG. 2 is a schematic diagram of a calculating graph provided in the present disclosure.

Referring to FIG. 2, for example, the user needs to use a deep learning model to calculate a total consumption in the restaurant, the input of the model can be determined as the unit price of a dish, the quantity of a dish, and a service fee coefficient. As shown in FIG. 2, the unit price of steamed fish is 100 RMB, the quantity of steamed fish is 2, the unit price of steamed shrimp is 150 RMB, the quantity of steamed shrimp is 3, and the service fee coefficient is 1.1 (i.e., an additional 10% fee will be charged on the basis of the dish price as the service fee). Furthermore, the product operator can be used to calculate the price of a dish based on its unit price and quantity. For example, steamed fish costs a total of 200 RMB and steamed shrimp costs a total of 450 RMB. By using the sum operator, the total price of the dish can be calculated as 650 RMB. Finally, based on the service fee coefficient, the product operator can be used to calculate the total consumption of the user in the restaurant as 715 RMB.

From the above content, it can be seen that the device corresponding to the master computing device node in the computing system cluster can determine operators required in a process of obtaining output data from input data based on the task code input by the user, and the data transmission relationships between operators, to obtain the global calculating graph corresponding to the to-be-executed task.

Figure 3:
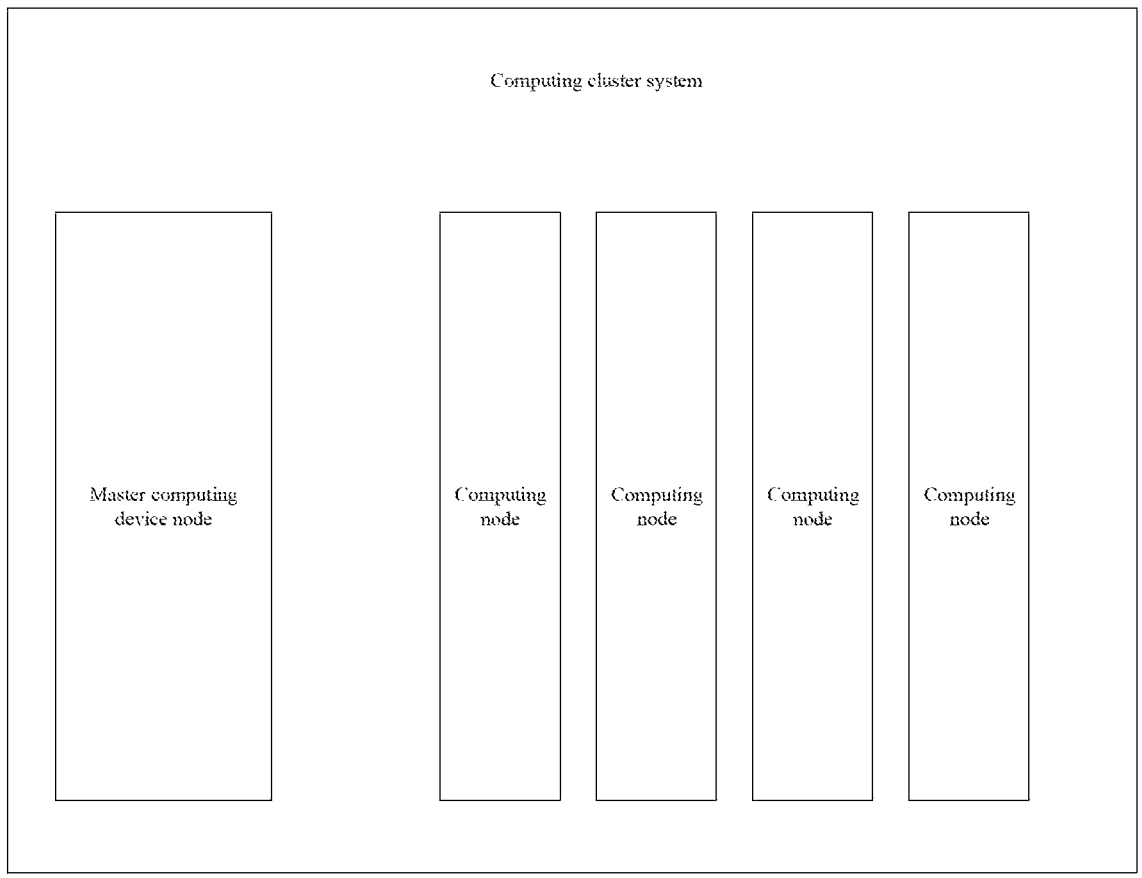
FIG. 3 is a schematic diagram of a computing cluster system provided in the present disclosure.

In addition, the computing cluster system mentioned above includes the master computing device node and multiple computing nodes, as shown in FIG. 3.

FIG. 3 is a schematic diagram of a computing cluster system provided in the present disclosure.

Referring to FIG. 3, it can be seen that a computing cluster system can include a master computing device node and computing nodes. The master computing device node can be a server or the Central Processing Unit (CPU) in a server. The computing nodes can refer to servers, or refer to the computing devices in the servers (such as CPU), graphics processing unit (GPU), graphics card, data processing unit (DPU), etc.

In the present disclosure, the execution subject of the method configured to implement task execution can refer to a designated device such as a server in the master computing device node of a computing cluster system, or can refer to a terminal device such as a desktop or a laptop. For ease of description, the following takes the server as the execution subject to explain the method for executing a task provided in the present disclosure.

In S102, by the master computing device node, the to-be-executed task is divided into subtasks, and for each of the subtasks, operators required to execute the subtask are determined based on the task code.

In the present disclosure, after the server determines the global calculating graph corresponding to the to-be-executed task through the master computing device node, the task can be divided into multiple subtasks, and for each subtask, the operators required to execute the subtask can be determined from the global calculating graph corresponding to the task, to determine the subtask calculating graph.

In some embodiments, the server can further divide the global calculating graph into subtask calculating graphs through the master computing device node, to divide the to-be-executed task into subtasks. Each subtask calculating graph corresponds to a subtask, and each subtask calculating graph contains at least some operators in the global calculating graph.

In S103, by the master computing device node, the subtasks are respectively distributed to computing nodes in the computing cluster system, such that for each of the computing nodes, the computing node generates an executable task subgraph for the computing node based on the operators required to execute the subtask distributed to the computing node and data transmission relationships between the operators required to execute the subtask distributed to the computing node, where the computing nodes are communicatedly connected with the master computing device node.

Further, the server can, by the master computing device node, respectively distribute the subtask calculating graphs corresponding to the subtasks to computing nodes, such that for each of the computing nodes, the computing node generates an executable task subgraph for the computing node based on the operators required to execute the subtask distributed to the computing node and data transmission relationships between the operators required to execute the subtask distributed to the computing node, where the computing nodes are communicatedly connected with the master computing device node.

For example, for each of the computing nodes, the server can, by the computing node, determine an executing order of the operators in the subtask calculating graph distributed to the computing node based on the operators in the subtask calculating graph distributed to the computing node and the data transmission relationships between the operators in the subtask calculating graph distributed to the computing node; and by the computing node, determine memory-unit-block information required to execute the subtask corresponding to the subtask calculating graph distributed to the computing node, where the memory-unit-block information includes identification information of the memory unit block, identification information of the subtask using the memory unit block, and information of data transmission stored in the memory unit block; and by the computing node, generate an executable task subgraph for the computing node based on the executing order and the memory-unit-block information.

It should be noted that to compile the task code input by the user, the first step is to determine the corresponding global calculating graph based on the task code input by the user. Then, the determined global calculating graph can be analysed to determine the nodes that can be merged in the global calculating graph, and the requirements for the executing order of the nodes, and other conditions, such that the global calculating graph can be optimized. After the distributing information of the memory unit block during the execution process of the optimized global calculating graph, an executable calculating graph can be generated based on the optimized global calculating graph and the distributing information of the memory unit block.

From the above content, it can be seen that the server can, by the master computing device node, divide the compilation work corresponding to the task code of the to-be-executed task, such that each computing node can independently compile its own executable task subgraph, thereby reducing the load and data transmission of the master computing device, and thereby improving the communication and compilation efficiency of task execution.

It is noted that the method of compiling based on the subtask calculating graph to obtain the executable task subgraph for each computing node can be to simulate the operation of the subtask calculating graph through pseudo input, thereby optimizing the subtask calculating graph based on the simulated operation results, and obtaining executable task subgraph.

The pseudo input mentioned above refers to the process of randomly generating pseudo data that meets the data format required for subtasks without actually running the executable program to generate real data, to assist in completing compilation.

In addition, in practical application scenarios, data transmission is often required between the subtasks executed by computing node, and the data transmitted between the computing nodes is usually tensor data (i.e., a data container, similar to a matrix, where the matrix is a two-dimensional tensor and the tensor is usually three-dimensional or more). From the above content, it can be seen that the computing nodes may be distributed within the same device (i.e., computing devices belonging to the same server), or they may be distributed across different devices (i.e., belonging to different servers or belonging to computing devices in different servers), and the data transmission attributes of these devices for tensor data transmission are also different.

The above data transmission attributes include: broadcast attribute (i.e. transmitting complete tensor data at once), segmentation attribute (i.e., segmenting the tensor data along rows or columns of tensor data to transmit different rows or columns of tensor data to different computing nodes), and local decomposition attribute (i.e. decomposing local data in tensor data to transmit the local tensor data).

For example, when a server transfers tensor data to another server, the broadcast attribute can be used. For example, a server can segment a tensor data to transmit different rows or columns of the segmented tensor data to a computing device in another server.

In practical application scenarios, there may be a discrepancy between a data transmission attribute when a computing device transmits data during data transmission and a data transmission attribute when another device receives data during data transmission, resulting in tensor data transmission failure. Therefore, the server can further, by the computing device node, determine the operators required to execute the subtask distributed to the computing node based on the task code, and determine the data transmission relationships between the subtask and other subtasks.

Further, the server, by the master computing device node, respectively distribute the subtasks to the computing nodes, such that for each of the computing nodes, the computing node determines a target subtask based on the data transmission relationships between each of the subtasks and other subtasks, wherein the target subtask has a data transmission relationship with the subtask distributed to the computing node; and determine whether a data transmission attribute of the computing node when executing the subtask distributed to the computing node is the same as a data transmission attribute of a computing node executing the target subtask; in response to determining that the data transmission attribute of the computing node when executing the subtask distributed to the computing node is the same as the data transmission attribute of a computing node executing the target subtask, generate the executable task subgraph for the computing node based on the operators required to execute the subtask distributed to the computing node, the data transmission relationships between the operators required to execute the subtask distributed to the computing node, and the data transmission relationships between the subtask distributed to the computing node and other subtasks.

in response to determining that the data transmission attribute of the computing node when executing the subtask distributed to the computing node is different from the data transmission attribute of a computing node executing the target subtask, the server, by the computing node, transmitting abnormal information indicating abnormal data transmission between the computing node and the computing node executing the target subtask to the master computing device node, such that the master computing device node generates a transformation subgraph based on the abnormal information returned by one or more computing nodes; and by the computing node, generate the executable task subgraph for the computing node based on the operators required to execute the subtask distributed to the computing node, the data transmission relationships between the operators required to execute the subtask distributed to the computing node, and the transformation subgraph.

The transformation subgraph is configured to transform a data transmission attribute of a computing node to make the data transmission attribute of the computing node same as a data transmission attribute of another computing node. For example, if the data transmission attribute of a computing node is segmentation attribute, and the data transmission attribute of another computing node is broadcast attribute, then the computing node can aggregate tensor data required to be transmitted by the computing node through the transformation subgraph, to obtain tensor data that satisfies the data transmission attribute of the another node.

Furthermore, in practical application scenarios, when the master computing device node determines the transformation subgraph, the master computing device node can convert the determined transformation subgraph into serialized data and transmit it to each computing node. Each computing node may use the transformation subgraph or use some operators contained in the transformation subgraph for transformation of the data transmission attribute. When different nodes use the same part of the operators contained in the transformation subgraph for transformation of the data transmission attribute, the memory-unit-block information used for storing tensor data by the different nodes leads to an error.

For example, "computing node a" needs to use "memory-unit-block information A" when converting the data transmission attribute using "operator 1" included in the transformation subgraph, while "computing node b" needs to use "memory-unit-block information B" when converting the data transmission attribute using "operator 1" included in the transformation subgraph. However, since the tensor data output by "operator 1" has the same information, that is, the tensor data output by "computing node a" after data transmission attribute conversion through "operator 1" is the same as the tensor data output by "computing node b" after data transmission attribute conversion through "operator 1", and only the specific values are different, which may cause "computing node a" to incorrectly obtain the tensor data output by "computing node b" after data transmission attribute conversion through "operator 1", leading to a compilation error.

Based on this, the server can, by the master computing device node, generate the transformation subgraph based on the abnormal information returned by the one or more computing nodes and transmit the transformation subgraph to the one or more computing nodes; for each of the one or more computing nodes, based on based on information of data transmission between the computing node and other computing nodes through the transformation subgraph when the computing node executes the subtask distributed to the computing node in the transformation subgraph, determine memory-unit-block information required for data transmission between the computing node and other computing nodes through the transformation subgraph when the computing device executes the subtask distributed to the computing node, as target memory-unit-block information; by the master computing device node, determine an identification number of the target memory-unit-block information, and store the identification number of the target memory-unit-block information and an identification number of the computing node as an identification number pair in the transformation subgraph.

Furthermore, when converting the data transmission attribute, the server can, by the computing node, determine whether there is the identification number pair corresponding to the identification number of the computing node in the transformation subgraph; in response to determining that there is the identification number pair corresponding to the identification number of the computing node in the transformation subgraph, the server, by the computing node, obtains the target memory-unit-block information based on the identification number of the target memory-unit-block information in the identification number pair corresponding to the identification number of the computing node, and generates the executable task subgraph for the computing node based on the operators required to execute the subtask distributed to the computing node, the data transmission relationship between the operators required to execute the subtask distributed to the computing node, the transformation subgraph, and the target memory-unit-block information.

in response to determining that there is no the identification number pair corresponding to the identification number of the computing node in the transformation subgraph, based on the information of data transmission between the computing node and other computing nodes through the transformation subgraph when the computing node executes the subtask distributed to the computing node in the transformation subgraph, the server, by the master computing device node, determines memory-unit-block information required for data transmission between the computing node and other computing nodes through the transformation subgraph when the computing device executes the subtask distributed to the computing node.

It should be noted that for each computing node, when generating an executable task subgraph, the computing node can generate an executable task subgraph based on the number of the subtask executed by the computing node, the number of the computing flow used to execute the subtask, and the identification number of the memory-unit-block information.

The above computing flow refers to the task distributing queue used for distributing a task between the master computing device node and the computing node, which can be understood as a channel built between the master computing device node and the computing node to transmit data for the distributed subtask.

In S104, by the computing nodes, the executable task subgraphs are run, to execute the to-be-executed task.

Furthermore, the server can, by the computing nodes, run the executable task subgraphs in parallel, to execute the to-be-executed task. The above-mentioned to-be-executed task can be, for example, image recognition task, unmanned vehicle route planning task, etc.

From the above methods, it can be seen that the compilation work of the task code input by the user for the to-be-executed task can be divided by the master computing device node, and some of the compilation work can be distributed to the computing nodes for execution, thereby reducing the workload of the master computing device node and improving the execution efficiency of the to-be-executed task.

The above is one or more methods for executing a task in the present disclosure. Based on the same idea, the present disclosure further provides an apparatus for executing a task, as shown in FIG. 4.

Figure 4:
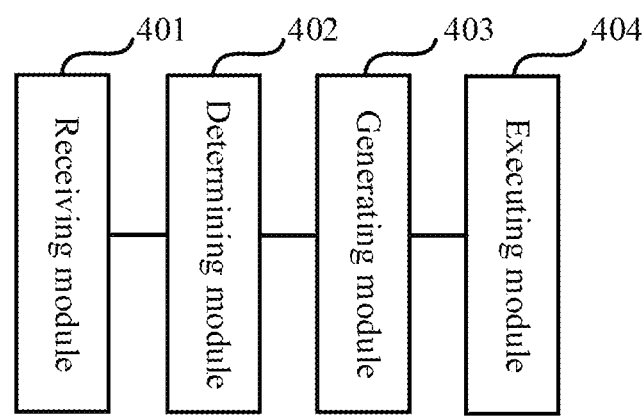
FIG. 4 is a schematic diagram of an apparatus for executing a task provided in the present disclosure.

FIG. 4 is a schematic diagram of an apparatus for executing a task provided in the present disclosure. The apparatus includes:

a receiving module 401, configured to, by a master computing device node, receive a task code of a to-be-executed task;

a determining module 402, configured to, by the master computing device node, divide the to-be-executed task into subtasks, and for each of the subtasks, determine operators required to execute the subtask based on the task code;

a generating module 403, configured to, by the master computing device node, respectively distribute the subtasks to computing nodes, such that for each of the computing nodes, the computing node generates an executable task subgraph for the computing node based on the operators required to execute the subtask distributed to the computing node and data transmission relationships between the operators required to execute the subtask distributed to the computing node; and an executing module 404, configured to, by the computing nodes, run the executable task subgraphs to execute the to-be-executed task.

In some embodiments, the determining module 402 is configured to, by the master computing device node, determine a global calculating graph of the to-be-executed task based on the task code, where the global calculating graph includes operators required to execute the to-be-executed task and data transmission relationships between the operators required to execute the to-be-executed task; and divide the global calculating graph into subtask calculating graphs to divide the to-be-executed task into subtasks, where each of the subtask calculating graphs includes at least some of the operators in the global calculating graph; and the generating module 403 is configured to, by the master computing device node, respectively distribute the subtask calculating graphs to the computing nodes, such that for each of the computing nodes, the computing node generates the executable task subgraph for the computing node based on the operators of the subtask calculating graph distributed to the computing node and data transmission relationships between the operators of the subtask calculating graph distributed to the computing node.

In some embodiments, the generating module 403 is configured to, by the computing node, determine an executing order of the operators in the subtask calculating graph distributed to the computing node based on the operators in the subtask calculating graph distributed to the computing node and the data transmission relationships between the operators in the subtask calculating graph distributed to the computing node; determine memory-unit-block information required to execute the subtask corresponding to the subtask calculating graph distributed to the computing node, where the memory-unit-block information includes identification information of the memory unit block, identification information of the subtask using the memory unit block, and information of data transmission stored in the memory unit block; and generate an executable task subgraph for the computing node based on the executing order and the memory-unit-block information.

In some embodiments, the generating module 403 is configured to, by the master computing device node, determine the operators required to execute the subtask based on the task code, and determine data transmission relationships between the subtask and other subtasks based on the task code; and respectively distribute the subtasks to the computing nodes in the computing cluster system, such that for each of the computing nodes, the computing node generates the executable task subgraph for the computing node based on the operators required to execute the subtask distributed to the computing node, the data transmission relationships between the operators required to execute the subtask distributed to the computing node, and the data transmission relationships between the subtask distributed to the computing node and other subtasks.

In some embodiments, the determining module 402 is configured to, by the master computing device node, determine the operators required to execute the subtask based on the task code, and determine data transmission relationships between the subtask and other subtasks based on the task code; and the generating module 403 is configured to, by the master computing device node, respectively distribute the subtasks to the computing nodes, such that for each of the computing nodes, the computing node determines a target subtask based on the data transmission relationships between each of the subtasks and other subtasks, wherein the target subtask has a data transmission relationship with the subtask distributed to the computing node; and determine whether a data transmission attribute of the computing node when executing the subtask distributed to the computing node is the same as a data transmission attribute of a computing node executing the target subtask; in response to determining that the data transmission attribute of the computing node when executing the subtask distributed to the computing node is the same as the data transmission attribute of a computing node executing the target subtask, generate the executable task subgraph for the computing node based on the operators required to execute the subtask distributed to the computing node, the data transmission relationships between the operators required to execute the subtask distributed to the computing node, and the data transmission relationships between the subtask distributed to the computing node and other subtasks.

In some embodiments, the generating module 403 is configured to, in response to determining that the data transmission attribute of the computing node when executing the subtask distributed to the computing node is different from the data transmission attribute of a computing node executing the target subtask, transmit abnormal information indicating abnormal data transmission between the computing node and the computing node executing the target subtask to the master computing device node, such that the master computing device node generates a transformation subgraph based on the abnormal information returned by one or more computing nodes, where the transformation subgraph is configured to transform a data transmission attribute of a computing node to make the data transmission attribute of the computing node same as a data transmission attribute of another computing node; and generate the executable task subgraph for the computing node based on the operators required to execute the subtask distributed to the computing node, the data transmission relationship between the operators required to execute the subtask distributed to the computing node, and the transformation subgraph.

In some embodiments, the generating module 403 is configured to, generate the transformation subgraph based on the abnormal information returned by the one or more computing nodes and transmit the transformation subgraph to the one or more computing nodes; for each of the one or more computing nodes, based on based on information of data transmission between the computing node and other computing nodes through the transformation subgraph when the computing node executes the subtask distributed to the computing node in the transformation subgraph, determine memory-unit-block information required for data transmission between the computing node and other computing nodes through the transformation subgraph when the computing device executes the subtask distributed to the computing node, as target memory-unit-block information; determine an identification number of the target memory-unit-block information, and storing the identification number of the target memory-unit-block information and an identification number of the computing node as an identification number pair in the transformation subgraph; and determine whether there is the identification number pair corresponding to the identification number of the computing node in the transformation subgraph; in response to determining that there is the identification number pair corresponding to the identification number of the computing node in the transformation subgraph, by the computing node, obtain the target memory-unit-block information based on the identification number of the target memory-unit-block information in the identification number pair corresponding to the identification number of the computing node, and generate the executable task subgraph for the computing node based on the operators required to execute the subtask distributed to the computing node, the data transmission relationship between the operators required to execute the subtask distributed to the computing node, the transformation subgraph, and the target memory-unit-block information.

In some embodiments, the generating module 403 is configured to, in response to determining that there is no the identification number pair corresponding to the identification number of the computing node in the transformation subgraph, based on the information of data transmission between the computing node and other computing nodes through the transformation subgraph when the computing node executes the subtask distributed to the computing node in the transformation subgraph, determine memory-unit-block information required for data transmission between the computing node and other computing nodes through the transformation subgraph when the computing device executes the subtask distributed to the computing node.

The present disclosure further provides a non-transitory computer-readable storage medium that stores a computer program, where the computer program may be configured to perform a method for executing a task as provided in FIG. 1 above.

Figure 5:
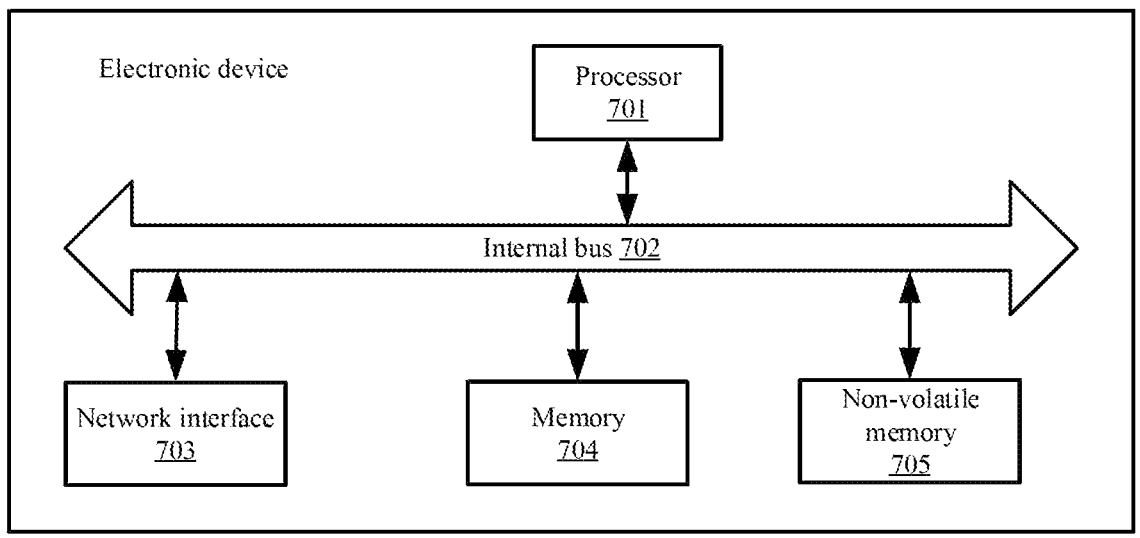
FIG. 5 is a schematic diagram of an electronic device corresponding to FIG. 1 provided in the present disclosure.

The present disclosure also provides a schematic structural diagram of an electronic device corresponding to FIG. 1 shown in FIG. 5. As shown in FIG. 5, at the hardware level, the electronic device includes a processor 701, an internal bus 702, a network interface 703, a memory 704, and a non-volatile memory 705, and may include hardware required for other operations. The processor reads the corresponding computer program from the non-volatile memory into the memory and then runs the computer program, to implement the method for executing a task described in FIG. 1 above. Of course, in addition to the software implementation, the present disclosure does not exclude other implementation methods, such as logic devices or a combination of hardware and software, etc. That is, the execution body of the following processing process is not limited to individual logic units, but can also be hardware or logic devices.

It was clear that improvements to a technology could be distinguished between hardware improvements (e.g., improvements to circuit structures such as diodes, transistors, switches, etc.) and software improvements (improvements to a method flow). However, with the development of technology, currently, the improvements of many method flows can be regarded as the direct improvements of the hardware circuit structures. Designers almost always get the corresponding hardware circuit structure by programming the improved method flow into the hardware circuit. Therefore, it cannot be said that a method flow improvement cannot be implemented with a hardware physical module. For example, a Programmable Logic Device (PLD) (e.g., Field Programmable Gate Array (FPGA)) is one such integrated circuit whose logic function is determined by user programming of the device. A digital system is "integrated" on a PLD by the designer's own programming, without the need for a chip manufacturer to design and manufacture a dedicated integrated circuit chip. Moreover, nowadays, instead of making IC chips manually, this programming is mostly implemented by "logic compiler" software, which is similar to the software compiler used for program development and writing, and the original code has to be written in a specific programming language before it is compiled. This is called Hardware Description Language (HDL), and there is not only one HDL, but many kinds, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc. Currently, the most commonly used is Very- High-Speed Integrated Circuit Hardware Description Language (VHDL) and Verilog. It should also be clear to those skilled in the art that a hardware circuit implementing the logical method flow can be easily obtained by simply programming the method flow with a little logic in one of the above hardware description languages and programming the method flow into the integrated circuit.

The controller can be implemented in any suitable manner, for example, the controller can take the form of, for example, a microprocessor or processor and a computer readable medium storing computer readable program code (e.g., software or firmware) executable by the (micro)processor, logic gates, switches, Application Specific Integrated Circuit (ASIC), programmable logic controllers and embedded microcontrollers. Examples of the controllers may include, but are not limited to, the following microcontrollers: ARC 625D, Atmel AT91SAM, Microchip PIC18F26K20, and Silicone Labs C8051F320, and memory controllers may also be implemented as part of the control logic of the memory. It is also known to those skilled in the art that, in addition to implementing the controller in a purely computer readable program code manner, it is entirely possible to make the controller perform the same function in the form of logic gates, switches, specialized integrated circuits, programmable logic controllers, embedded microcontrollers, etc. by logically programming the method steps. Thus such a controller can be considered as a hardware component, and the devices included therein for implementing various functions can also be considered as structures within the hardware component. Or even, the apparatus for implementing various functions can be considered as both a software module for implementing a method and a structure within a hardware component.

The systems, apparatuses, modules, or units elucidated in the above embodiments can be implemented specifically by a computer chip or entity, or by a product with certain functions. An exemplary implementation device is a computer. Specifically, the computer may be, for example, a personal computer, a laptop computer, a cellular phone, a camera phone, a smart phone, a personal digital assistant, a media player, a navigation device, an email device, a gaming console, a tablet computer, a wearable device, or a combination of any of these devices.

For the convenience of description, the above devices are divided into various units according to their functions and described respectively. It is, of course, possible to implement the functions of each unit in the same or multiple software and/or hardware when implementing the present disclosure.

It should be understood by those skilled in the art that embodiments of the present disclosure may be provided as methods, systems, or computer program products. Accordingly, the present disclosure may take the form of an entirely hardware embodiment, an entirely software embodiment, or an embodiment combining software and hardware aspects. Furthermore, the present disclosure may employ the form of a computer program product implemented on one or more computer-usable storage media (including, but not limited to, disk storage, CD-ROM, optical storage, etc.), where the one or more computer-usable storage media having computer-usable program code.

the present disclosure is described with reference to flowcharts and/or block diagrams of methods, devices (systems), and computer program products according to embodiments of the present disclosure. It is to be understood that each process and/or block in the flowchart and/or block diagram, and the combination of processes and/or blocks in the flowchart and/or block diagram, may be implemented by computer program instructions. These computer program instructions may be provided to a processor of a general-purpose computer, a specialized computer, an embedded processor, or other programmable data processing device to produce a machine such that instructions executed by the processor of the computer or other programmable data processing device produce a apparatus for implementing a function specified in one or more processes of the flowchart and/or one or more blocks of the block diagram.

These computer program instructions may also be stored in a computer-readable memory capable of directing the computer or other programmable data processing device to operate in a particular manner such that the instructions stored in the computer-readable memory produce an article of manufacture including an instruction apparatus that implements the function specified in one or more processes of the flowchart and/or one or more blocks of the block diagram.

These computer program instructions may also be loaded onto a computer or other programmable data processing device such that a series of operational steps are executed on the computer or other programmable device to produce computer-implemented processing such that the instructions executed on the computer or other programmable device provide the steps used to perform the functions specified in one or more processes of the flowchart and/or one or more blocks of the block diagram.

In an exemplary configuration, the computing device includes one or more processors (CPUs), input/output interfaces, network interfaces, and memory.

Memory may include at least one of non-permanent storage in computer readable media, random access memory (RAM) or non-volatile memory, such as read only memory (ROM) or flash RAM. Memory is an example of a computer readable medium.

Computer readable media include permanent and non-permanent, removable and non-removable media that can be implemented by any method or technology to store information. Information may be computer readable instructions, data structures, modules of a program, or other data. Examples of storage media for computers include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, compact disc read only memory (CDROM), digital versatile disc (DVD) or other optical storage, magnetic cartridge tape, magnetic tape magnetic disk storage, other magnetic storage device or any other non-transport medium that can be used to store information that can be accessed by a computing device. As defined herein, computer readable media does not include transitory computer readable media, such as modulated data signals and carriers.

It should also be noted that the term "include", "comprise" or any other variation thereof is intended to cover non-exclusive inclusion, such that a process, method, article, or device that includes a set of elements includes not only those elements, but also other elements that are not explicitly listed, or other elements that are inherent to such a process, method, commodity, or device. Without further limitation, the element defined by the statement "including a . . . " do not preclude the existence of additional identical elements in the process, method, article, or device that include the element.

It should be understood by those skilled in the art that embodiments of the present disclosure may be provided as methods, systems, or computer program products. Accordingly, the present disclosure may take the form of an entirely hardware embodiment, an entirely software embodiment, or an embodiment combining software and hardware aspects. Furthermore, the present disclosure may employ the form of a computer program product implemented on one or more computer-usable storage media (including, but not limited to, disk storage, CD-ROM, optical storage, etc.), where the one or more computer-usable storage media having computer-usable program code.

The present disclosure may be described in the general context of computer-executable instructions executed by a computer, such as a program module. Generally, a program module includes routines, programs, objects, components, data structures, and the like that perform a specific task or implement a specific abstract data type. the present disclosure may also be practiced in distributed computing environments where tasks are performed by remote processing devices that are connected via a communication network. In distributed computing environments, program modules may be located in local and remote computer storage medium, including storage devices.

The various embodiments in the present disclosure are described in a progressive manner, and the same or similar parts between the various embodiments may be referred to each other, and each embodiment focuses on the differences from other embodiments. In particular, for a system embodiment, since it is basically similar to the method embodiment, the description is relatively simple, and for related parts, please refer to the partial description of the method embodiment.

What is claimed is:

1. A method for executing a task, wherein the method is applied to a computing cluster system, and the method comprises:
   receiving, by a master computing device node in the computing cluster system, a task code of a to-be-executed task;
   dividing, by the master computing device node, the to-be-executed task into subtasks, and for each of the subtasks, determining, by the master computing device node and based on the task code, operators required to execute the subtask, and data transmission relationships between the subtask and other subtasks;
   respectively distributing, by the master computing device node, the subtasks to computing nodes in the computing cluster system, such that for each of the computing nodes, the computing node generates an executable task subgraph for the computing node based on the operators required to execute the subtask distributed to the computing node and data transmission relationships between the operators required to execute the subtask distributed to the computing node, wherein the computing nodes are communicatedly connected with the master computing device node; and
   running, by the computing nodes, the executable task subgraphs to execute the to-be-executed task;
   wherein, respectively distributing, by the master computing device node, the subtasks to the computing nodes in the computing cluster system, such that for each of the computing nodes, the computing node generates the executable task subgraph for the computing node based on the operators required to execute the subtask distributed to the computing node and the data transmission relationships between the operators required to execute the subtask distributed to the computing node comprises:
   respectively distributing, by the master computing device node, the subtasks to the computing nodes, such that for each of the computing nodes, the computing node determines a target subtask based on the data transmission relationships between each of the subtasks and other subtasks, wherein the target subtask has a data transmission relationship with the subtask distributed to the computing node; and
   determining, by the computing node, whether a data transmission attribute of the computing node when executing the subtask distributed to the computing node is the same as a data transmission attribute of a computing node executing the target subtask;
   in response to determining that the data transmission attribute of the computing node when executing the subtask distributed to the computing node is the same as the data transmission attribute of a computing node executing the target subtask, generating, by the computing node, the executable task subgraph for the computing node based on the operators required to execute the subtask distributed to the computing node, the data transmission relationships between the operators required to execute the subtask distributed to the computing node, and the data transmission relationships between the subtask distributed to the computing node and other subtasks;
   wherein the data transmission attribute comprises a broadcast attribute, a segmentation attribute, and a local decomposition attribute.

2. The method according to claim 1, wherein
   dividing, by the master computing device node, the to-be-executed task into the subtasks, and for each of the subtasks, determining, by the master computing device node and based on the task code, the operators required to execute the subtask comprises:
   determining, by the master computing device node, a global calculating graph of the to-be-executed task based on the task code, wherein the global calculating graph comprises operators required to execute the to-be-executed task and data transmission relationships between the operators required to execute the to-be-executed task; and
   dividing, by the master computing device node, the global calculating graph into subtask calculating graphs to divide the to-be-executed task into the subtasks, wherein each of the subtask calculating graphs comprises at least some of the operators in the global calculating graph; and
   respectively distributing, by the master computing device node, the subtasks to the computing nodes in the computing cluster system, such that for each of the computing nodes, the computing node generates the executable task subgraph for the computing node based on the operators required to execute the subtask distributed to the computing node and the data transmission relationships between the operators required to execute the subtask distributed to the computing node comprises:
   respectively distributing, by the master computing device node, the subtask calculating graphs to the computing nodes, such that for each of the computing nodes, the computing node generates the executable task subgraph for the computing node based on the operators of the subtask calculating graph distributed to the computing node and data transmission relationships between the operators of the subtask calculating graph distributed to the computing node.

3. The method according to claim 2, wherein the method further comprises:
for each of the computing nodes,
determining, by the computing node, an executing order of the operators in the subtask calculating graph distributed to the computing node based on the operators in the subtask calculating graph distributed to the computing node and the data transmission relationships between the operators in the subtask calculating graph distributed to the computing node;
determining, by the computing node, memory-unit-block information required to execute the subtask corresponding to the subtask calculating graph distributed to the computing node, wherein the memory-unit-block information comprises identification information of the memory unit block, identification information of the subtask using the memory unit block, and information of data transmission stored in the memory unit block; and
generating, by the computing node, an executable task subgraph for the computing node based on the executing order and the memory-unit-block information.

4. The method according to claim 1, wherein
determining, by the master computing device node and based on the task code, the operators required to execute the subtask comprises:
determining, by the master computing device node and based on the task code, the operators required to execute the subtask, and determining, by the master computing device node and based on the task code, data transmission relationships between the subtask and other subtasks; and
respectively distributing, by the master computing device node, the subtasks to the computing nodes in the computing cluster system, such that for each of the computing nodes, the computing node generates the executable task subgraph for the computing node based on the operators required to execute the subtask distributed to the computing node and the data transmission relationships between the operators required to execute the subtask distributed to the computing node comprises:
respectively distributing, by the master computing device node, the subtasks to the computing nodes in the computing cluster system, such that for each of the computing nodes, the computing node generates the executable task subgraph for the computing node based on the operators required to execute the subtask distributed to the computing node, the data transmission relationships between the operators required to execute the subtask distributed to the computing node, and the data transmission relationships between the subtask distributed to the computing node and other subtasks.

5. The method according to claim 1, wherein the method further comprises:
in response to determining that the data transmission attribute of the computing node when executing the subtask distributed to the computing node is different from the data transmission attribute of a computing node executing the target subtask, transmitting, by the computing node, abnormal information indicating abnormal data transmission between the computing node and the computing node executing the target subtask to the master computing device node, such that the master computing device node generates a transformation subgraph based on the abnormal information returned by one or more computing nodes, wherein the transformation subgraph is configured to transform a data transmission attribute of a computing node to make the data transmission attribute of the computing node same as a data transmission attribute of another computing node; and
generating, by the computing node, the executable task subgraph for the computing node based on the operators required to execute the subtask distributed to the computing node, the data transmission relationships between the operators required to execute the subtask distributed to the computing node, and the transformation subgraph.

6. The method according to claim 5, wherein
generating, by the master computing device node, the transformation subgraph based on the abnormal information returned by the one or more computing nodes comprises:
generating, by the master computing device node, the transformation subgraph based on the abnormal information returned by the one or more computing nodes and transmitting, by the master computing device node, the transformation subgraph to the one or more computing nodes;
for each of the one or more computing nodes, based on information of data transmission between the computing node and other computing nodes through the transformation subgraph when the computing node executes the subtask distributed to the computing node in the transformation subgraph, determining, by the master computing device node, memory-unit-block information required for data transmission between the computing node and other computing nodes through the transformation subgraph when the computing device executes the subtask distributed to the computing node, as target memory-unit-block information; and
determining, by the master computing device node, an identification number of the target memory-unit-block information, and storing, by the master computing device node, the identification number of the target memory-unit-block information and an identification number of the computing node as an identification number pair in the transformation subgraph; and
generating, by the computing node, the executable task subgraph for the computing node based on the operators required to execute the subtask distributed to the computing node, the data transmission relationships between the operators required to execute the subtask distributed to the computing node, and the transformation subgraph comprises:
determining, by the computing node, whether there is the identification number pair corresponding to the identification number of the computing node in the transformation subgraph; and
in response to determining that there is the identification number pair corresponding to the identification number of the computing node in the transformation subgraph, obtaining, by the computing node, the target memory-unit-block information based on the identification number of the target memory-unit-block information in the identification number pair corresponding to the identification number of the computing node, and generating, by the computing node, the executable task subgraph for the computing node based on the operators required to execute the subtask distributed to the computing node, the data transmission relationships between the operators required to execute the subtask distributed to the computing node, the transformation subgraph, and the target memory-unit-block information.

* * * * *